(No Model.) 2 Sheets—Sheet 1.
J. S. WECKMAN.
FIELD ROLLER.
No. 503,629. Patented Aug. 22, 1893.
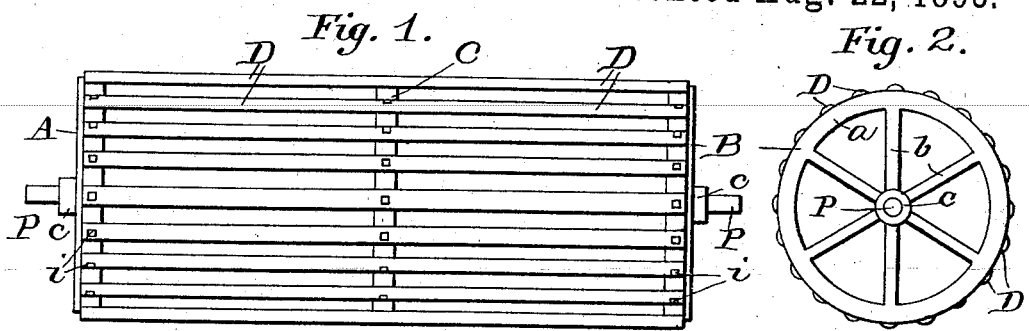
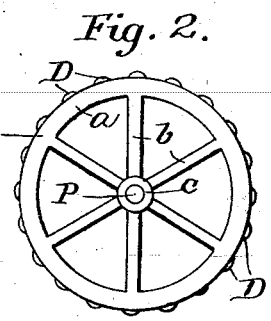
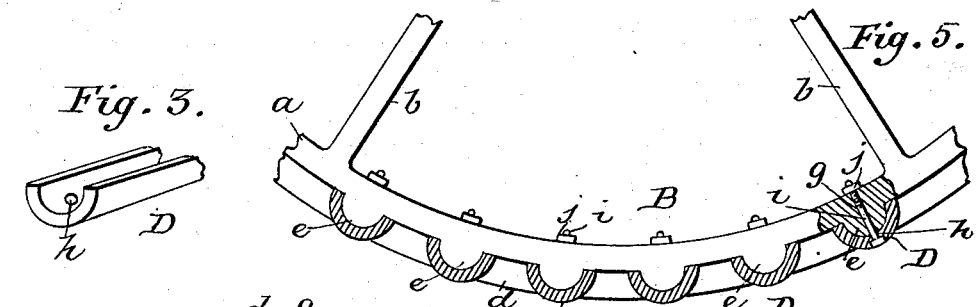
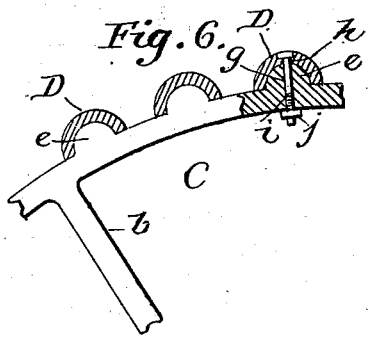
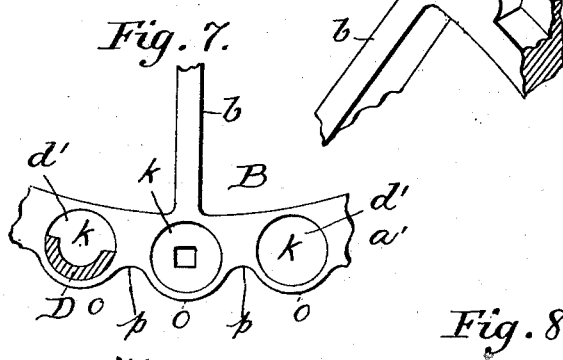
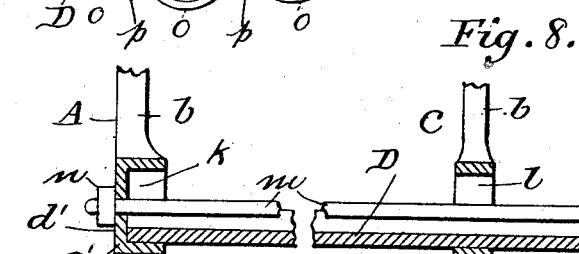
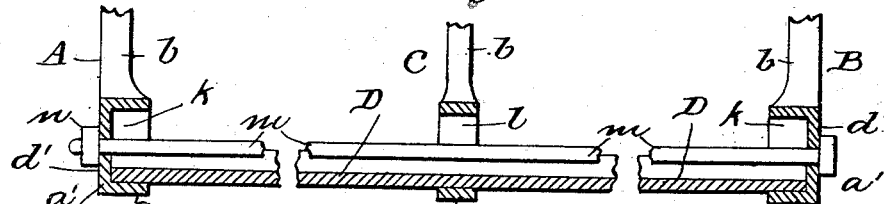
Witnesses
Albert B. Blackwood
Jas H Blackwood
Inventor
John S. Weckman
by [Attorney signature]
his Attorney (No Model.) 2 Sheets—Sheet 2.
J. S. WECKMAN.
FIELD ROLLER.
No. 503,629. Patented Aug. 22, 1893.
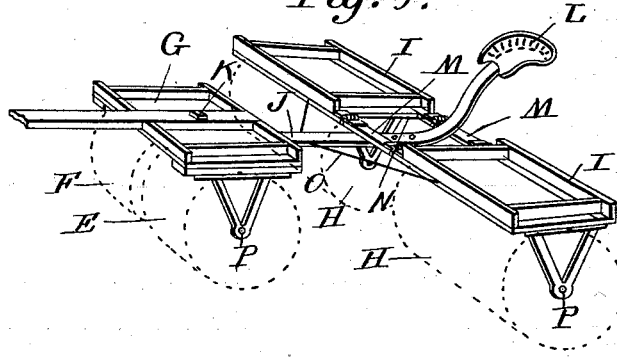
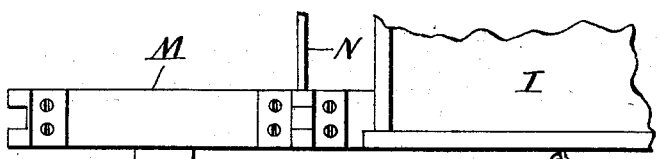
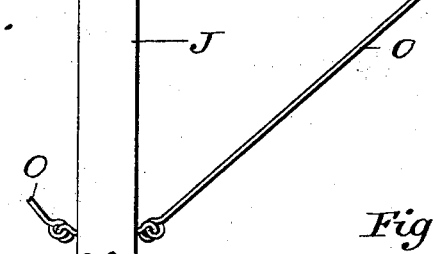
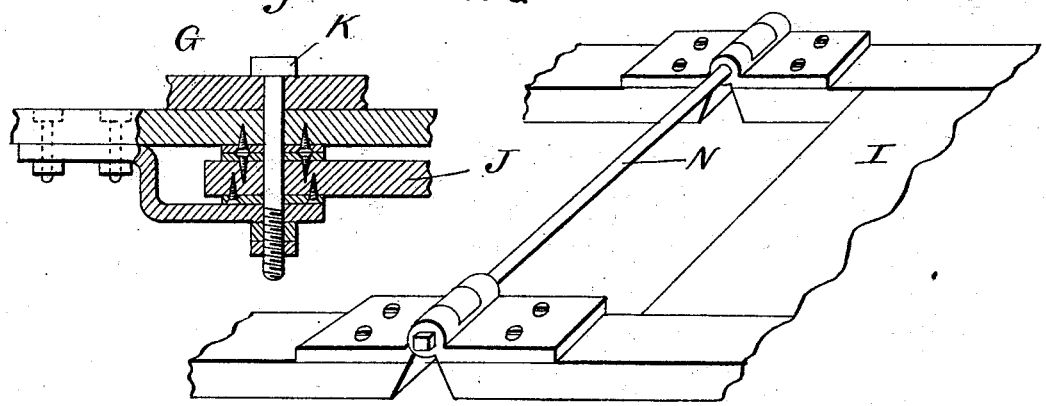
Witnesses
Albert B Blackwood
Jos H Blackwood
Inventor
John S. Weckman
by Arthur V Browne
his Attorney

UNITED STATES PATENT OFFICE.

JOHN S. WECKMAN, OF CANTON, OHIO.

FIELD-ROLLER.

SPECIFICATION forming part of Letters Patent No. 503,629, dated August 22, 1893.

Application filed March 22, 1893. Serial No. 467,176. (No model.)

*To all whom it may concern:*

Be it known that I, JOHN S. WECKMAN, of Canton, in the county of Stark and State of Ohio, have invented certain new and useful Improvements in Field-Rollers, of which the following is a specification.

This invention consists in certain improvements upon the field roller described in Letters-Patent of the United States No. 387,468, granted to me August 7, 1888. In said patent there is described a single roller having its periphery composed of round separated longitudinal crushing pipes. In accordance with the present invention there are three rollers, a forward or leading roller, and two trailing rollers located side by side and at the rear of the leading roller. The reach which connects the trailing rollers with the leading roller is pivoted at its forward end to the frame of the leading roller so that the leading roller may turn horizontally, and the frames of the trailing rollers are pivotally connected with the reach so as to turn vertically, whereby the entire machine may turn around easily, and the trailing rollers may rise and fall to accommodate themselves to unevenness in the ground. To facilitate the turning of the entire machine, the leading roller is composed of two independently-revolving cylinders placed end to end. This general arrangement of the machine is not new, being shown for example in United States Letters-Patent No. 167,380, granted September 7, 1875, to Ephraim H. Adams, and in United States Letters-Patent No. 199,508, granted January 22, 1878, to Roger W. Bunting.

The present improvements in respect to the general arrangement consist in the improved means for connecting the parts together.

The principal part of the present invention relates to the construction of each of the cylinders or rollers. Instead of the periphery of each roller being composed of separated pipes, it is composed of semi-tubular or semi-cylindrical concavo-convex crushing bars extending longitudinally. Preferably in connection with these semi-cylindrical concavo-convex crushing bars, specially-shaped heads are employed to receive them. Each cylinder or roller also has, by preference, a strengthening wheel at its center to support the crushing bars at their centers.

The present improvements are illustrated in the accompanying drawings, wherein—

Figure 1, is a front view of a single roller or cylinder detached from the machine and constructed in accordance with the present improvements. Fig. 2, is an end view of the cylinder or roller. Fig. 3, is a perspective view of one end of one of the semi-cylindrical concavo-convex crushing pipes. Fig. 4, is a perspective view of a portion of one of the roller heads. Fig. 5, is a cross-section through a portion of the crushing bars looking toward the inner face of one of the roller heads. Fig. 6, is a cross-section through a portion of the crushing bars looking toward the central strengthening wheel of one of the rollers. Fig. 7, is a view similar to Fig. 5, showing a modification of the roller head. Fig. 8, is a longitudinal section through one of the crushing bars, both roller heads and the central strengthening wheel, illustrating the modification shown in Fig. 7. Fig. 9, is a perspective view of the entire machine. Fig. 10, is a detail sectional view showing the pivotal connections between the frame of the leading roller and the reach. Fig. 11, is a detail view of the pivotal connection between the reach and the frame of one of the trailing rollers.

I will first describe the construction of one of the rollers, as illustrated in Figs. 1 to 6 inclusive. The roller is composed of two heads A, B, a central strengthening wheel C, and a plurality of longitudinally-extending crushing bars D D, which extend between heads A B and are supported at their centers by the wheel C. The several bars D D constitute a cylinder, with longitudinal spaces between them, so that the roller is an open roller as in my said Patent No. 387,468. Each of the crushing bars D is semi-tubular or semi-cylindrical and concavo-convex in cross section, as shown in Figs. 3, 5, and 6. The crushing bars are so mounted on the heads that their convex portions are on the outside, so that only the convex surfaces of the bars come in contact with the ground. Accordingly all of the advantages of the round crushing pipes specified in my aforesaid Patent No. 387,468, are preserved. An important advantage also is that the roller can be used to roll ground after corn, oats, wheat and other plants are up, since there are no sharp edges to cut the same. The advantages of the semi-cylindrical concavo-convex bars over the pipes formerly employed by me are that they are lighter, taking only one-half the metal, and are much cheaper since they can be rolled out from steel.

To receive the semi-cylindrical crushing bars D, each of the heads A B is specially formed, as is shown most clearly in Fig. 4. Each head is made of a single piece of metal, and has a circular rim or tread $a$ connected by radial spokes $b\ b$, with a central hub $c$ (see Fig. 2) through which passes the axle P; an outer flange $d$ perpendicular to the rim $a$, and a plurality of lugs $e\ e$ one for each of the bars D. Each lug $e$ is shaped to fit within the concave face of its crushing bar, and is of a depth somewhat less than that of the flange $d$, as seen at $f$. The several crushing bars fit over the lugs $e$ and abut against the flange $d$ which insures their proper position. Each lug has a bolt-hole $g$ and each bar has a bolt-hole $h$, through which passes a fastening bolt $i$, which is secured in place by a nut $j$ on the inside of the rim $a$, as shown most clearly in Fig. 5. The hole $h$ in bar D is countersunk to receive the head of the bolt $i$. The outer faces of the crushing bars preferably extend outwardly as far as or slightly beyond the flange $d$, as shown in Fig. 5, so that the weight of the roller is carried by the crushing bars and the full length of the bars is effective. The central strengthening wheel C, is similar to the heads A B, except that (see Fig. 6) it has no flange $d$ and it is only necessary to bolt a few of the bars thereto. This wheel C prevents the inward bending or buckling of the bars D, and insures their rigidity. Being entirely within the bars D, the wheel C does not interfere at all with their crushing and pulverizing action.

In the modification shown in Figs. 7, and 8, the semi-cylindrical concavo-convex bars are shown secured in circular sockets $k$ in the heads A B, such as were employed with the pipes in my said Patent No. 387,468. The heads A and B in this modification have rims $a'$ which are provided with the sockets $k$, the sockets not extending through the rim but having closed outer walls $d'$ against which the ends of the bars D abut. The corresponding sockets $l$ in the central wheel C are, however open at both ends, so that the bars D may extend therethrough. In this modification the bars are not secured by separate bolts, since they are held in place sufficiently well by the sockets $k\ l$, but the heads A B are tied together by through bolts $m$ and nuts $n$, as in my said Patent No. 387,468. In order, however, that the weight of the roller may fall upon the bars and not upon the heads and the wheel C to an undue extent, the outer margins $o\ o$ of the sockets $k\ l$ are made as thin as practicable, and the rims of the heads and the wheel C are corrugated or indented as shown at $p\ p$ in Fig. 7, the indentations $p\ p$ coming between the sockets. The tread of each rim is hence composed of a plurality of convex portions outlying and parallel with the convex faces of the crushing bars.

The entire machine is illustrated in Fig. 9, wherein E F are the two front rollers mounted in a frame G, which also constitutes a weight-box as is usual in machines of this character. H H are the rear rollers, and I I their frames which also serve as weight-boxes. The reach J, is pivotally connected to and beneath the center of the front frame G, by a vertical king-bolt K (a fifth-wheel might be employed) which permits the front frame to turn. The reach J carries the driver's seat L, and has at its rear cross-bars M M to the outer ends of which the rear frames I I are pivoted by horizontally-extending bolts N N or other equivalent hinges which permit the rear frames to rise and fall and follow the inequalities of the ground. Brace rods O are provided, each pivoted at its forward end near the front end of the reach and at its rear end to one of the frames I near the center thereof, so as to take the pulling strain off from the bolts N N.

I claim as my invention—

1. A semi-cylindrical concavo-convex crushing bar for a land roller, substantially as set forth.

2. A land roller having heads at its opposite ends, in combination with a plurality of semi-cylindrical concavo-convex crushing bars arranged cylindrically around said heads, each bar having its convex side outside and connected at its opposite ends with said heads respectively, substantially as set forth.

3. A land roller having heads at its opposite ends, in combination with a plurality of semi-cylindrical concavo-convex crushing bars arranged cylindrically around said heads, each bar having its convex side outside and connected at its opposite ends with said heads respectively, and a central strengthening wheel midway between said heads and co-operating with the middle portions of said crushing bars, substantially as set forth.

4. A head or wheel of a land roller, having a rim with projecting lugs, in combination with semi-cylindrical concavo-convex crushing bars fitting over said lugs, substantially as set forth.

5. The head having rim $a$, flange $d$, and lugs $e\ e$, in combination with the semi-cylindrical concavo-convex bars D fitting over said lugs and bolted thereto, substantially as set forth.

6. The head or wheel having a rim with its periphery composed of convex faces, in combination with bars having convex outer faces, substantially as set forth.

7. In a land roller, the front frame, and the reach pivoted thereto, in combination with the rear frames pivoted to said reach on opposite sides thereof, and the brace rods pivotally connected at their front ends to the front part of the reach and at their rear ends to the rear frames respectively, substantially as set forth.

In witness whereof I have hereunto signed my name in the presence of two subscribing witnesses.

JOHN S. WECKMAN.

Witnesses:
ORLANDO C. VOLKMOR,
JOHN C. GIVIN.